(12) United States Patent
Ikeda et al.

(10) Patent No.: US 8,678,349 B2
(45) Date of Patent: Mar. 25, 2014

(54) PRESSURE-OPERATED CONTROL VALVE

(75) Inventors: Tadaaki Ikeda, Sayama (JP); Yasumasa Takada, Sayama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 116 days.

(21) Appl. No.: 13/147,641

(22) PCT Filed: Mar. 26, 2010

(86) PCT No.: PCT/JP2010/055412
§ 371 (c)(1),
(2), (4) Date: Aug. 3, 2011

(87) PCT Pub. No.: WO2010/116901
PCT Pub. Date: Oct. 14, 2010

(65) Prior Publication Data
US 2011/0284790 A1    Nov. 24, 2011

(30) Foreign Application Priority Data

Apr. 6, 2009    (JP) .................................. 2009-002123

(51) Int. Cl.
| F16K 31/00 | (2006.01) |
| F16K 1/00 | (2006.01) |
| F16K 15/00 | (2006.01) |
| F16K 31/12 | (2006.01) |
| F16K 31/36 | (2006.01) |
| F01B 31/00 | (2006.01) |

(52) U.S. Cl.
USPC ....... 251/331; 251/63.4; 251/335.2; 137/510; 92/101

(58) Field of Classification Search
USPC .......... 137/510; 251/331, 335.2, 63.4; 92/101
See application file for complete search history.

(56) References Cited

U.S. PATENT DOCUMENTS 2,748,797 A * 6/1956 Heizer et al. .................. 137/510
4,684,106 A * 8/1987 Kolenc et al. ............. 251/335.2

FOREIGN PATENT DOCUMENTS

| JP | 60-16268 | 1/1985 |
| JP | 2001-12824 | 1/2001 |
| JP | 2002-71037 A1 | 3/2002 |
| JP | 2002-349732 A1 | 12/2002 |
| JP | 2003-139429 A1 | 5/2003 |
| JP | 2003-336914 A1 | 11/2003 |

(Continued)

OTHER PUBLICATIONS

International Search Report for International Application No. PCT/JP2010/055412 dated Apr. 7, 2010.

(Continued)

*Primary Examiner* — John K Fristoe, Jr.
*Assistant Examiner* — Hailey K Do
(74) *Attorney, Agent, or Firm* — Kratz, Quintos & Hanson, LLP

(57) ABSTRACT

A ball valve and a valve shaft are in a valve chamber. The ball valve opens and closes a valve port. A coil spring arranged in a spring chamber pushes the valve shaft against a diaphragm via a spring bracket of the valve shaft. A cone portion and a flat portion (or a concave portion) inside the cone portion are on the diaphragm. A diaphragm-side end face of the valve shaft is larger in diameter than the flat portion of the diaphragm. When the diaphragm is initially deformed, a boundary portion interposed between the cone portion and the flat portion abuts on the diaphragm-side end face.

6 Claims, 4 Drawing Sheets

(56) References Cited

FOREIGN PATENT DOCUMENTS

| JP | 2004-100771 A1 | 4/2004 |
| JP | 2006-77823 A1 | 3/2006 |
| JP | 2006-153409 A1 | 6/2006 |
| JP | 2008-57949 A1 | 3/2008 |

OTHER PUBLICATIONS

Notification of First Office Action from The State Intellectual Property Office of P.R. China issued Oct. 29, 2012 in counterpart application No. 2010800120107 with English translation.

* cited by examiner

PRESSURE-OPERATED CONTROL VALVE

TECHNICAL FIELD

This invention relates to a pressure-operated control valve having a configuration in which a valve body is pushed against a valve seat by a spring force of a diaphragm, and when the diaphragm starts being deformed by a setup pressure of fluid, the valve is open.

BACKGROUND ART

A conventional pressure-operated valve is disclosed in, for example, JP, A, 2006-77823 (Patent Document 1), and JP, A, 2002-71037 (Patent Document 2).

The valve disclosed in Patent Document 1 is a valve in which an inner space is formed by a cap member having an inlet connection pipe and an outlet connection pipe and by a stopper member having a through hole in the center thereof, the inner space is separated to a first room and a second room by a diaphragm, and the diaphragm faces a valve seat attached to the outlet connection pipe. Then, when a pressure of the first room is less than a specific value, the diaphragm abuts on the valve seat to close the valve, and when the pressure in the first room is more than a specific value, the diaphragm is removed from the valve seat to open the valve.

The valve disclosed in Patent Document 2 is a relief valve for use in such as a high pressure control valve, in which a reverse plate assembly (diaphragm) and a stopper holding member are swaged to be fixed to a valve housing having an inlet coupling and an outlet coupling, and this reverse plate assembly faces a relief valve port of the valve seat. Then, when a pressure of a valve chamber is less than a specific value, the reverse plate assembly closes the relief valve port, and when the pressure in the valve chamber is more than a specific value, the reverse plate assembly is reversed to open the relief valve port.

This kind of pressure-operated control valve works when a pressure is more than a setup pressure value, and is used instead of, for example, a relief valve disclosed in JP, A, 2003-336914 (Patent Document 3) and a liquid sealing prevention path disclosed in JP, A, 2003-139429 (Patent Document 4). Therefore, in many cases, the valve is used for a security purpose, and required to have a small leak, because under the setup pressure, even a tiny valve leak directly reduces a cycle COP value.

PRIOR ART DOCUMENT

Patent Document

Patent Document 1: JP, A, 2006-77823
Patent Document 2: JP, A, 2002-71037
Patent Document 3: JP, A, 2003-336914
Patent Document 4: JP, A, 2003-139429

DISCLOSURE OF THE INVENTION

Problem to be Solved by the Invention

The diaphragm used in the pressure-operated control valve of Patent Document 1 may be unevenly deformed a little when the diaphragm is deformed by the pressure due to non-uniformity of a shape or material thereof. Further, in the reverse plate assembly used in the pressure-operated control valve of Patent Document 2, there is a gap between the reverse plates due to a dislocation of an axis of each reverse plate, and due to variations in shapes thereof, other than the non-uniformity. Therefore, together with an increase of the pressure, one or more reverse plates independently start deformed for closing the gap.

This non-uniformity of the deformation of the diaphragm and the reverse plate assembly causes a liquid leak. For example, as shown in FIG. 8, when a diaphragm "a" is slightly deformed and the deformation is not even, even though a portion "A" contacts a valve seat "b", a gap is generated at a portion "B", thereby a liquid leak occurs from a valve port "c". This is because the diaphragm "a" and the reverse plate assembly start being deformed slightly before the pressure reaches the setup pressure.

Accordingly, an object of the present invention is to provide a pressure-operated control valve configured to prevent a liquid leak even when a diaphragm is deformed unevenly.

Means for Solving the Problem

For attaining the object, according to the invention described in claim 1, there is provided a pressure-operated control valve including:

a diaphragm made of multilayered metal plates having a frustum-shaped conical portion and a flat portion or a concave portion at an inside of the conical portion;

a valve port formed between a primary port and a secondary port;

a valve body configured to open and close the valve port;

a valve shaft interposed between the diaphragm and the valve body, and configured to push the valve body onto the valve port due to a reactive force of the diaphragm; and a coil spring configured to push the valve shaft onto the diaphragm, wherein a boundary portion interposed between the conical portion and the flat portion or the concave portion of the diaphragm abuts on an inside of an end face of the valve shaft at the diaphragm side.

Effects of the Invention

According to the invention claimed in claim 1, the diaphragm has the conical portion and the flat portion or the concave portion. The rigidity at the boundary portion between the conical portion and the flat portion, or the boundary portion between the conical portion and the concave portion is larger than that at the other portions. Therefore, when the diaphragm starts an initial deformation due to an increase of the liquid pressure, at least a part of the boundary portion of the diaphragm is not deformed during the initial deformation. Therefore, an end face of the valve shaft at the diaphragm side contacts the diaphragm on at least a part of the boundary portion, and a movement of the valve shaft and the valve body is prevented, thereby the valve port is maintained a closed state. Therefore, the liquid leak upon the initial deformation of the diaphragm is prevented.

DESCRIPTION OF EMBODIMENTS

Figure 1:
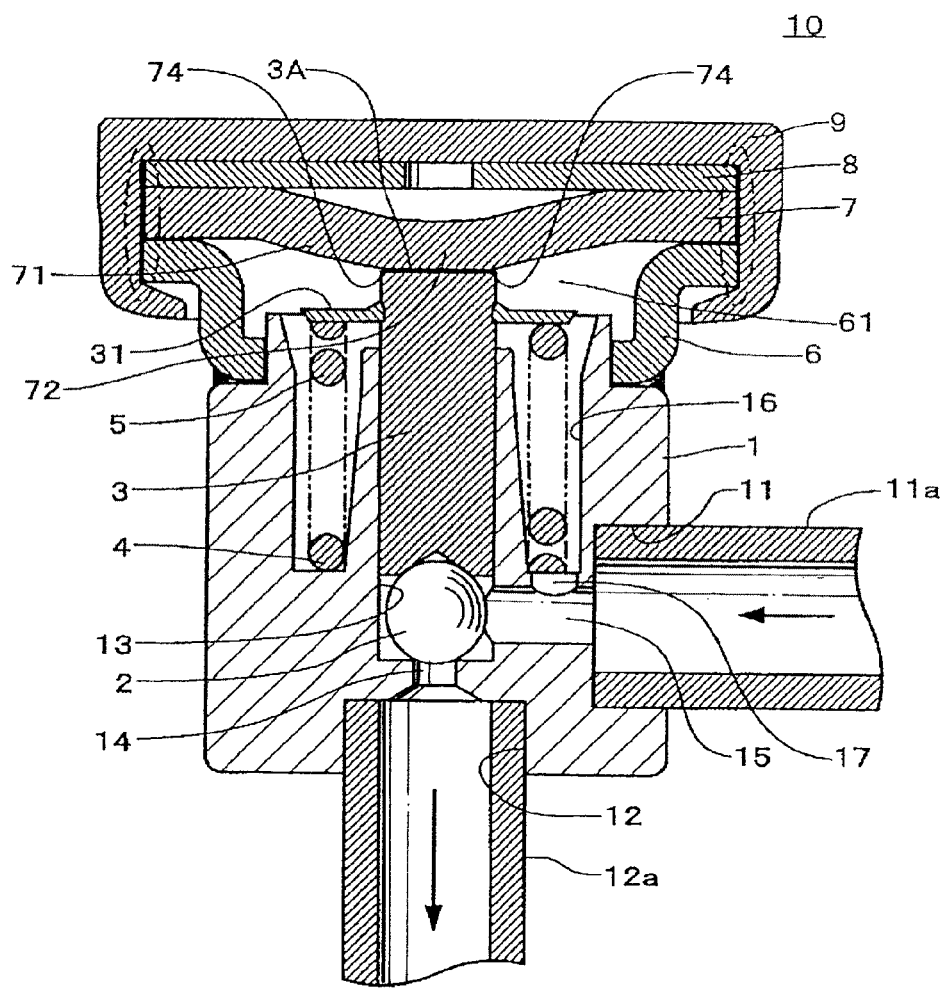
FIG. 1 A vertical sectional view showing a pressure-operated control valve according to an embodiment of the present invention.
Figure 2:
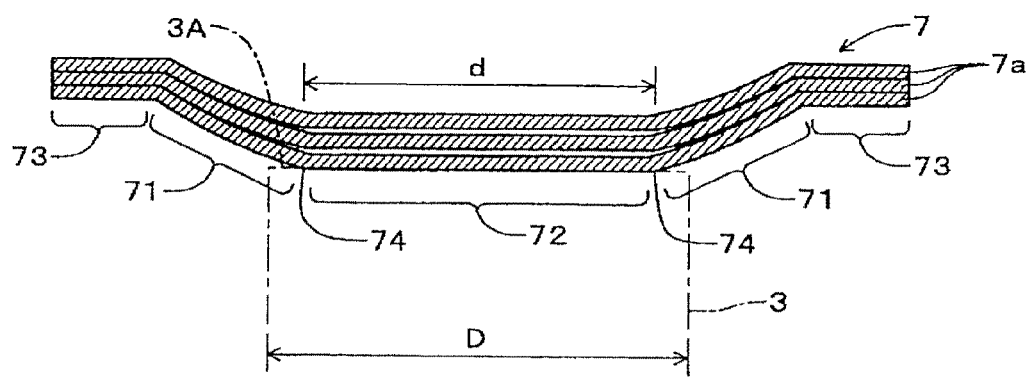
FIG. 2 An enlarged sectional view showing a detail of a diaphragm of the pressure-operated control valve according to the embodiment.

Next, an embodiment of a pressure-operated control valve according to the present invention will be explained with reference to figures. FIG. 1 is a vertical sectional view showing the pressure-operated control valve 10 according to the embodiment. FIG. 2 is an enlarged sectional view showing a detail of a diaphragm 7 of the pressure-operated control valve 10 according to the present invention.

The pressure-operated control valve 10 of this embodiment includes a valve housing 1. The valve housing 1 is provided with a primary port 11 in which a fluid flows, a secondary port 12 from which the fluid flows out, a cylindrical shaped valve chamber 13, a valve port 14, a passage 15, a spring chamber 16, and a passage 17. An inlet coupling 11a is attached to the primary port 11, and an outlet coupling 12a is attached to the secondary port 12. The inlet coupling 11a communicates with the valve chamber 13 via the passage 15, and the outlet coupling 12a communicates with the valve chamber 13 via the valve port 14. Further, the passage 15 communicates with the spring chamber 16 via the passage 17.

The valve chamber 13 and the spring chamber 16 are formed by drilling an opposite end of the secondary port 12. A ball valve 2 as a valve body and a valve shaft 3 are arranged in the valve chamber 13. The ball valve 2 is fixed to an end of the valve shaft 3. The spring chamber 16 is formed as a ring-shaped deep groove around the valve chamber 13. A coil spring 5 is arranged in the spring chamber 16. A flange-shaped spring bracket 31 is fixed to the valve shaft 3. The coil spring 5 is compressed between the valve housing 1 and the spring bracket 31. Thereby, the coil spring 5 pushes the valve shaft 3 on a later-described diaphragm 7.

A ring-shaped cap 6 is integrally assembled with valve housing 1 by brazing around an opening of the spring chamber 16 of the valve housing 1. Further, the later-described diaphragm 7 and a stopper 8 are attached to the cap 6. The cap 6, the diaphragm 7, and the stopper 8 are welded at an outer periphery indicated by a chain lined oval shown in FIG. 1. Then, while covering the diaphragm 7 and the stopper 8, a reinforcing member 9 is overlaid on the cap 6. Then, by swaging an end of the reinforcing member 9, the reinforcing member 9 is integrally assembled with the cap 6. Thereby, a pressure chamber 61 for applying a pressure to the diaphragm 7 is formed on an inside of the cap 6.

According to the above structure, a supercritical refrigerant such as carbon dioxide gas flows into the pressure-operated control valve 10 via the inlet coupling 11a. This refrigerant applies the pressure to the diaphragm 7 via the passage 15, the passage 17, the spring chamber 16, and the pressure chamber 61. When this pressure is less than a predetermined pressure, the diaphragm 7 is not deformed, the valve shaft 3 is pushed by the reactive force of the diaphragm 7, and the ball valve 2 is pushed toward the valve port 14, thereby the pressure-operated control valve 10 is in a valve close condition shown in FIG. 1. Further, the refrigerant from the inlet coupling 11a flows into the valve chamber 13 via the passage 15. However, in the condition shown in FIG. 1, the ball valve 2 closes the valve port 14, thereby the refrigerant does not flow into the outlet coupling 12a. Meanwhile when the pressure of the refrigerant is increased and the pressure in the spring chamber 16 becomes more than the predetermined pressure, the diaphragm 7 is deformed, and the valve shaft 3 and the ball valve 2 are moved following the deformation of the diaphragm 7 by the spring force of the coil spring 5. Thereby, the valve port 14 is released, and the pressure-operated control valve 10 becomes in a valve open condition.

As shown in FIG. 2, the diaphragm 7 is made by laminating a plurality of disc-shaped metallic flat spring 7a, and includes a circular truncated cone shaped corn portion 71 having a slightly spherical shaped wall; a flat portion 72 located at the inside center of the cone portion 71; and a flange portion 73 located at an outer periphery of the corn portion 71. A boundary portion 74 interposed between the corn portion 71 and the flat portion 72 is projected obliquely relative to the valve shaft 3. The rigidity of the boundary portion 74 is higher than those of the other portions. Further, the valve shaft 3 is in a cylindrical shape, and has a circular diaphragm-side end face 3A at the diaphragm 7 side. A diameter D of the diaphragm-side end face 3A is larger than a diameter d of the flat portion 72 of the diaphragm 7.

Figure 3:
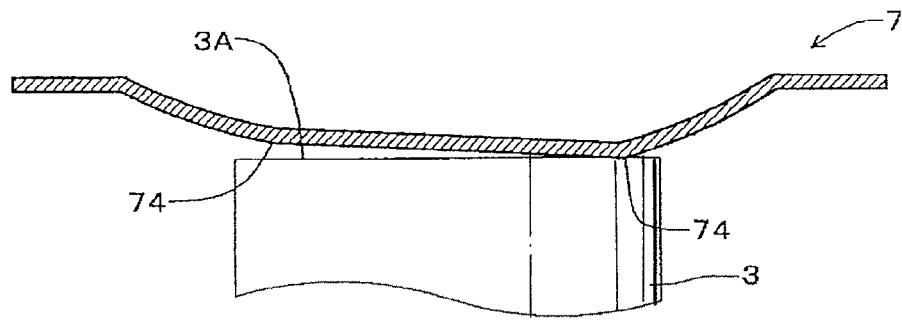
FIG. 3 An explanatory view showing an example of an operation with the diaphragm and a valve shaft of the pressure-operated control valve according to the embodiment.

In this way, for example, as shown in FIG. 3, when the fluid pressure is close to the predetermined pressure due to the increase of the fluid pressure, the diaphragm 7 is initially deformed. However, at this time, at least a part of the boundary portion 74 of the diaphragm 7 is not initially deformed, and deformed behind the other parts of the boundary portion 74. Therefore, the diaphragm-side end face 3A of the valve shaft 3 abuts on the part of the boundary portion 74 of the diaphragm 7, and the movement of the valve shaft 3 (namely, the ball valve 2) is prevented. Therefore, even when the fluid pressure becomes close to the predetermined pressure, the valve port 14 is maintained in a closed condition. Namely, the liquid leak upon the initial deformation of the diaphragm 7 is prevented.

Figure 4:
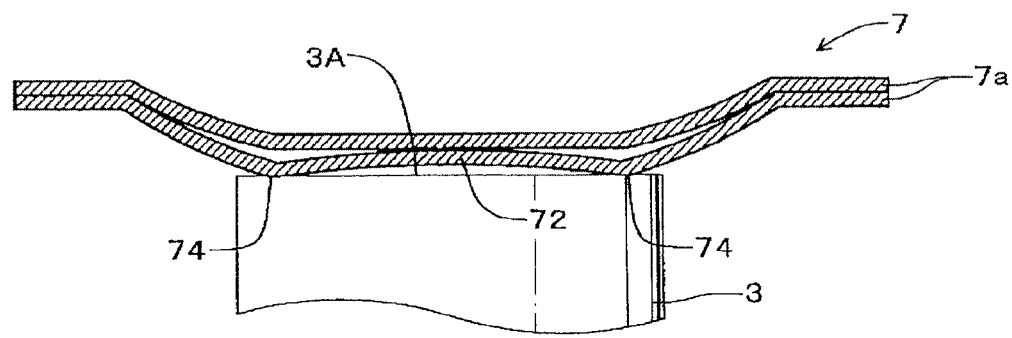
FIG. 4 An explanatory view showing the other example of the operation with the diaphragm and the valve shaft of the pressure-operated control valve according to the embodiment.

Further, for example, as shown in FIG. 4, when a gap between the flat springs 7a, 7a of the diaphragm 7 is large, the flat portion 72 may be recessed due to the initial deformation of the diaphragm 7. Even in this case, a part of the boundary portion 74 of the diaphragm 7 is not deformed upon the initial deformation. Namely, a position of a part of the boundary portion 74 is not changed, the diaphragm-side end face 3A of the valve shaft 3 abuts on the part of the boundary portion 74 of the diaphragm 7. Therefore, the valve port 14 is maintained in a closed condition, and the liquid leak upon the initial deformation of the diaphragm 7 is prevented.

Figures 5A, 5B:
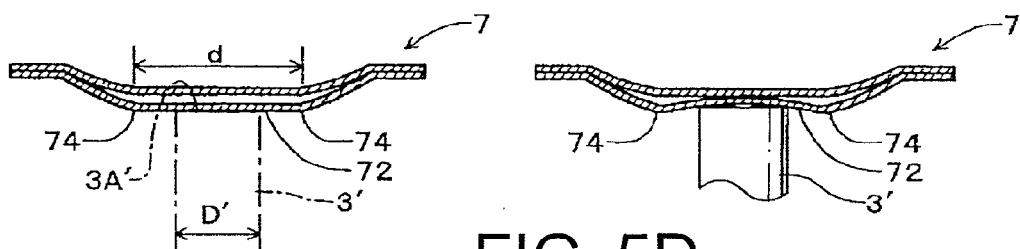
FIG. 5A, FIG. 5B, FIG. 5C, FIG. 5D Explanatory views showing a pressure operated control valve having a liquid leak.
Figures 5C, 5D:
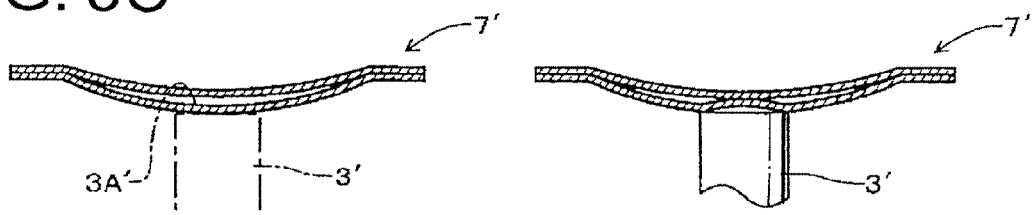

Incidentally, as shown in a valve shaft 3' of FIG. 5A, when the diameter D' of the diaphragm-side end face 3A' is smaller than the diameter d of the flat portion 72 of the diaphragm 7, as shown in FIG. 5B, even when the boundary portion 74 is not moved upon the initial deformation of the diaphragm 7, the valve shaft 3' is moved upward following the deformation of the flat portion 72. Further, when the flat portion 72 does not exist like the diaphragm 7' of FIG. 5C, as shown in FIG. 5D, the valve shaft 3' is moved upward upon the initial deformation of the diaphragm 7'. Therefore, the liquid leak occurs upon the initial deformation of the diaphragm 7, 7'. Such a liquid leak does not occur according to the present invention.

Figure 6A:
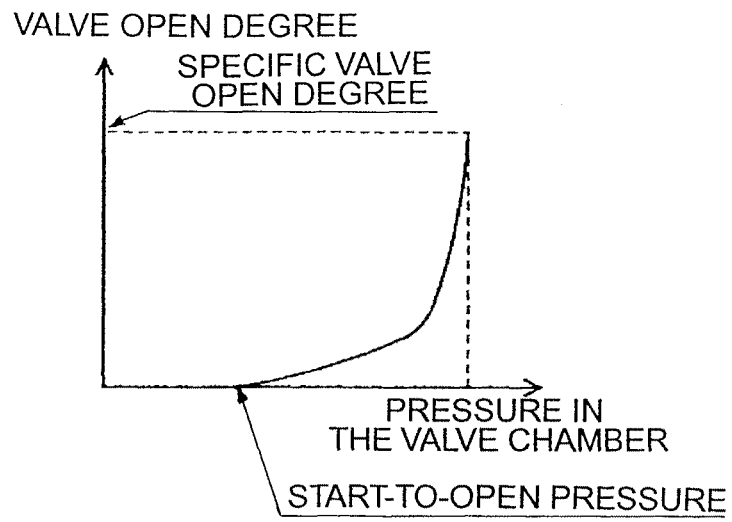
FIG. 6A, FIG. 6B Views showing a comparison of a valve open degree characteristic between the pressure-operated control valve of the embodiment and a valve having a liquid leak.
Figure 6B:
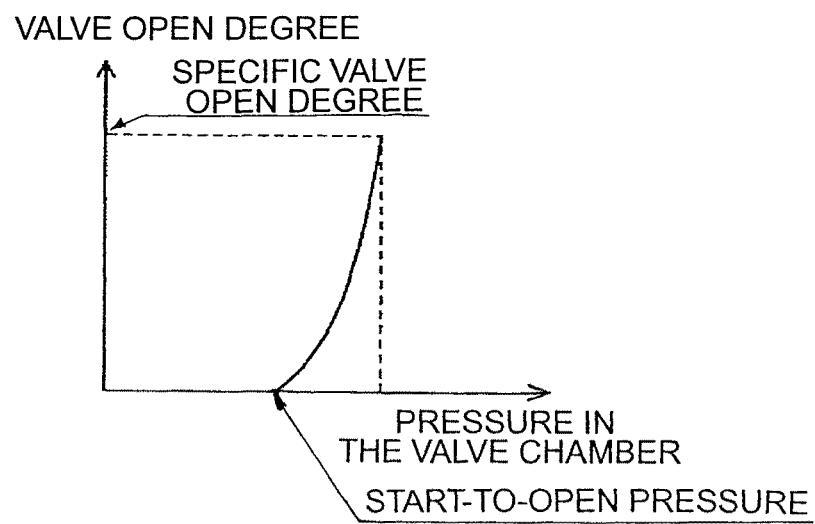

FIGS. 6A, 6B are a valve open degree graph of the pressure-operated control valve 10 of the embodiment, and of the pressure-operated control valve having a liquid leak such as shown in FIGS. 5A to 5D. As shown in FIG. 6A, a characteristic curve of the pressure-operated control valve having a liquid leak gradually curves upward from a start-to-open pressure (start-to-initial deformation pressure) to a specific open valve degree. Namely, before reaching the specific open valve degree, the valve is open in a wide range, and the liquid leak occurs. In contrast, because in the pressure-operated control valve 10 according to the embodiment, the valve close condition by the ball valve 2 is maintained even upon the initial deformation of the diaphragm 7, as shown in FIG. 6B, a characteristic curve of the pressure-operated control valve 10 steeply curves upward from a start-to-open pressure (end-of-initial deformation pressure) to a specific open valve degree, thereby the liquid leak is prevented.

Figure 7:
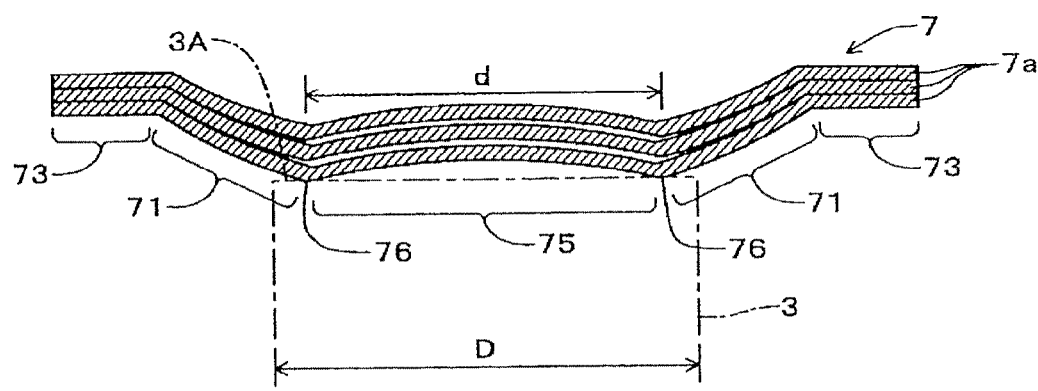
FIG. 7 An enlarged sectional view showing the other embodiment of the diaphragm according to the pressure-operated control valve of the embodiment.
Figure 8:
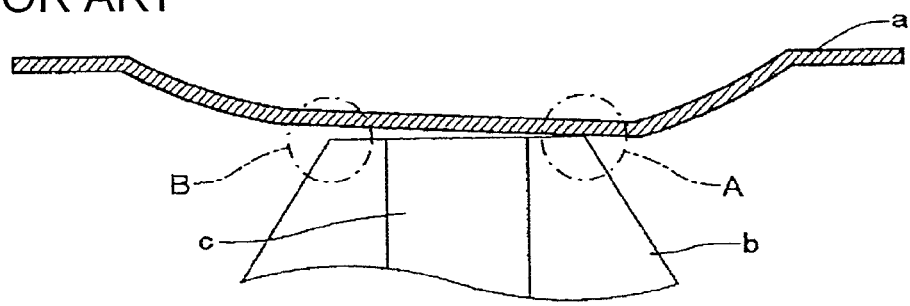
FIG. 8 An explanatory view showing a problem of a conventional pressure-operated control valve.

FIG. 7 shows another embodiment of the diaphragm 7. The components similar to those in FIG. 2 are indicated by the same reference numerals as FIG. 2. In the previous embodiment, the diaphragm 7 has the flat portion 72. However, according to this embodiment, the diaphragm 7 may have a concave portion 75 concaved from the valve shaft 3 side at an inside of the corn portion 71 instead of the flat portion 72. In this case, the boundary portion 76 interposed between the corn portion 71 and the concave portion 75 works similar to the boundary portion 74 in the previous embodiment.

Incidentally, in these embodiments, the diaphragm 7 is made by laminating a plurality of metallic flat spring. However, according to the invention, the diaphragm 7 may made of a single flat spring.

REFERENCE SIGNS LIST 1 valve housing
2 ball valve
3 valve shaft
3A diaphragm-side end face
5 coil spring
7 diaphragm
10 pressure-operated control valve
11 primary port
12 secondary port
13 valve chamber
14 valve port
71 corn portion
72 flat portion
74 boundary portion

The invention claimed is:

1. A pressure-operated control valve comprising:
a diaphragm comprised of multilayered metal plates each having a frustum-shaped conical portion and a flat portion or a concave portion at an inside of the conical portion;
a valve port formed between a primary port and a secondary port;
a valve body configured to open and close the valve port;
a valve shaft interposed between the diaphragm and the valve body, and configured to push the valve body onto the valve port due to a reactive force of the diaphragm, the valve shaft having an end face that bears on the diaphragm at the inside of the conical portion; and
a coil spring configured to push the valve shaft onto the diaphragm;
wherein the diaphragm includes a boundary portion interposed between the conical portion and the flat portion or the concave portion of the diaphragm, and
wherein a diameter D of the end face of the valve shaft is larger than a diameter d of the flat portion or the concave portion of the diaphragm at the inside of the conical portion, whereby the boundary portion abuts on an inside of the end face of the valve shaft at the diaphragm side.

2. The pressure-operated control valve of claim 1, wherein the valve is a normally-closed valve.

3. The pressure-operated control valve of claim 2, wherein a rigidity of the boundary portion is higher than a rigidity of other portions of the diaphragm,
whereby a closed state of the pressure-operated control valve is maintained up to a predetermined pressure, and initial liquid leak is prevented.

4. The pressure-operated control valve of claim 1,
wherein each of the multilayered metal plates individually includes the frustum-shaped conical portion, the flat portion or concave portion, and the boundary portion therebetween, and
wherein the diaphragm includes a gap between the plates.

5. The pressure-operated control valve of claim 3, wherein the conical portion of the diaphragm has a slightly spherical shaped wall.

6. The pressure-operated control valve of claim 1, wherein the conical portion of the diaphragm has a slightly spherical shaped wall.

* * * * *